(12) United States Patent
Takimoto et al.

(10) Patent No.: US 6,194,875 B1
(45) Date of Patent: *Feb. 27, 2001

(54) CONTROLLER FOR DC-DC CONVERTER

(75) Inventors: Kyuichi Takimoto; Toshiyuki Matsuyama, both of Kasugai; Hidekiyo Ozawa; Seiya Kitagawa, both of Kawasaki, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,432

(22) Filed: Oct. 7, 1999

(30) Foreign Application Priority Data

Oct. 8, 1998 (JP) .................................................. 10-286586

(51) Int. Cl.[7] ................................. H02J 7/04; G05F 1/56
(52) U.S. Cl. ......................... 320/164; 320/162; 320/163; 320/141; 323/282
(58) Field of Search .................... 320/140, 141, 320/164, 162, 163, 145; 323/282, 284, 285, 288, 234, 351

(56) References Cited

U.S. PATENT DOCUMENTS

| 5,572,112 | 11/1996 | SAEKI et al. | 323/282 |
|---|---|---|---|
| 5,747,947 | 5/1998 | Hak | 315/308 |
| 5,850,137 | * 12/1998 | Takimoto et al. | 320/164 |
| 5,905,361 | * 5/1999 | Saeki et al. | 320/119 |
| 5,966,003 | * 10/1999 | Takimoto et al. | 323/224 |
| 6,008,629 | * 12/1999 | Saeki et al. | 320/140 |
| 6,025,706 | * 2/2000 | Takimoto et al. | 323/282 |

FOREIGN PATENT DOCUMENTS

| 0 419 727 | 4/1991 | (EP) . |
|---|---|---|
| 0 614 266 | 9/1994 | (EP) . |
| 0 650 249 | 4/1995 | (EP) . |
| 0 693 815 | 1/1996 | (EP) . |

OTHER PUBLICATIONS

PATENT ABSTRACTS OF JAPN, Vol. 9706, No. 10, Oct. 31, 1997 & JP 09 172772, Jun 30, 1997.
PATENT ABSTRACTS OF JAPAN, Vol. 9501, No. 04, May 31, 1995 & JP 07 015954, Jan. 17, 1995.

* cited by examiner

*Primary Examiner*—Peter S. Wong
*Assistant Examiner*—Pia Tibbits
(74) *Attorney, Agent, or Firm*—Arent Fox Kintner Plotkin & Kahn, PLLC

(57) ABSTRACT

A DC—DC converter generates a system output current and a battery charging current. The converter has an output transistor connected between an AC adapter, which provides a supply current, and a terminal at which the battery charging current is provided. A control circuit generates a duty control signal used to activate and deactivate the output transistor in order to adjust the battery charging current. The control circuit includes a voltage detection circuit that compares a DC power supply voltage of the AC adapter with a first reference voltage and generates a differential voltage signal from the comparison result. A PWM comparison circuit is connected to the voltage detection circuit and compares the differential voltage signal with a triangular wave signal to generate the duty control signal which has a duty ratio corresponding to the comparison result.

21 Claims, 5 Drawing Sheets

CONTROLLER FOR DC-DC CONVERTER

BACKGROUND OF THE INVENTION

The present invention relates to a method and a circuit for controlling a DC—DC converter, and more particularly, to a method and a circuit for controlling a DC—DC converter that generates the operational power for portable electronic equipment and the charging power of a battery used in such electronic equipment.

Portable electronic equipment, such as notebook computers, include a DC—DC converter which generates system power and battery charging power from a DC power supply provided by an external AC adapter. The DC—DC converter is set such that the sum of the system consumption current and the battery charging current is smaller than the current supply capacity of the AC adapter. This is because an overcurrent limiter of the AC adapter inhibits the current output when the value of the current sum becomes greater than the AC adapter's current supply capacity. Thus, it is advantageous if the DC—DC converter can make full use of the entire current supply capacity.

FIG. 1 is a schematic diagram showing a first prior art example of a DC—DC converter 100. The DC—DC converter 100 includes a control circuit 2 and a plurality of external elements. The control circuit 2 and the external elements are formed in the same semiconductor integrated circuit. The control circuit 2 outputs a signal SG1 to the gate of an output transistor 3, which is preferably an enhancement type PMOS transistor. An AC adapter 4 provides a DC power supply voltage Vin to the source of the output transistor 3 via a resistor R1. The DC power supply voltage Vin is also provided to an output terminal EX1 via the resistor R1 and a diode D1. The output voltage Vout1 is provided to an electronic device from the output terminal EX1. The drain of the output transistor 3 is connected to a charging output terminal EX2 via an output coil 5 and a resistor R2. The charging output terminal EX2 is connected to the output terminal EX1 via a diode D2. The output voltage Vout2 is provided to a battery BT from the charging output terminal EX2.

The drain of the output transistor 3 is also connected to the cathode of a flywheel diode 6, which may be a Schottky diode. The anode of the flywheel diode 6 is connected to a ground GND. The node between the output coil 5 and the resistor R2 is connected to the ground GND via a smoothing capacitor 7. The smoothing capacitor 7 and the output coil 5 form a smoothing circuit which smoothes the output voltage Vout2.

The control circuit 2 includes a first current detection amplifying circuit 11, a second current detection amplifying circuit 12, first, second, and third error amplifying circuits 13, 14, 15, a PWM comparison circuit 16, a triangular wave oscillating circuit 17, and an output circuit 18.

The first current detection amplifying circuit 11 has an inverting input terminal connected to the low potential terminal of the resistor R1 and a non-inverting input terminal connected to the high potential terminal of the resistor R1. The amplifying circuit 11 detects the value of the current I0 supplied by the AC adapter 4 and provides the first error amplifying circuit 13 with a first voltage signal SG2 corresponding to the current value. An increase in the supply current I0 increases the potential of the first voltage signal SG2. A decrease in the supply current I0 decreases the potential of the first voltage signal SG2. The supply current I0 is equal to the sum of the output current I1 of the output terminal EX1 and the charging current I2 (flowing through the resistor R2) provided to the battery BT by the charging output terminal EX2.

The first error amplifying circuit 13 has an inverting input terminal, which is provided with the first voltage signal SG2, and a non-inverting input terminal, which is provided with a first reference voltage Vref1. The first error amplifying circuit 13 compares the first voltage signal SG2 with the first reference voltage Vref1 and amplifies the voltage difference to generate a first error output signal SG3, which is provided to the PWM comparison circuit 16. An increase in the potential of the first voltage signal SG2 decreases the potential of the first error output signal SG3, and a decrease in the potential of the first voltage signal SG2 increases the potential of the first error output signal SG3.

The second current detection amplifying circuit 12 has an inverting input terminal connected to the low potential terminal of the resistor R2 and a non-inverting input terminal connected to the high potential terminal of the resistor R2. The amplifying circuit 12 detects the value of the charging current I2 supplied to the battery BT and provides the second error amplifying circuit 14 with a second voltage signal SG4 corresponding to the detected value. An increase in the charging current I2 increases the potential of the second voltage signal SG4. A decrease in the charging current I2 decreases the potential of the second voltage signal SG4.

The second error amplifying circuit 14 has an inverting input terminal, which is provided with the second voltage signal SG4, and a non-inverting input terminal, which is provided with a second reference voltage Vref2. The second error amplifying circuit 14 compares the second voltage signal SG4 with the second reference voltage Vref2 and amplifies the voltage difference to generate a second error output signal SG5, which is provided to the PWM comparison circuit 16. An increase in the potential of the second voltage signal SG4 decreases the potential of the second error output signal SG5, and a decrease in the potential of the second voltage signal SG4 increases the potential of the second error output signal SG5.

The third error amplifying circuit 15 has an inverting input terminal, which is provided with the output voltage Vout2, and a non-inverting input terminal, which is provided with a third reference voltage Vref3. The third error amplifying circuit 15 compares the output voltage Vout2 with the third reference voltage Vref3 and amplifies the voltage difference to generate a third error output signal SG6, which is provided to the PWM comparison circuit 16. An increase in the voltage Vout2 decreases the potential of the third error output signal SG6, and a decrease in the output voltage Vout2 increases the potential of the third error output signal SG6.

The PWM comparison circuit 16 has a first non-inverting input terminal which receives the first error output signal SG3, a second non-inverting input terminal which receives the second error output signal SG5, a third non-inverting input terminal which receives the third error output signal SG6, and an inverting input terminal which receives a triangular wave signal SG7 from the triangular wave oscillating circuit 17.

Among the first, second, and third error output signals SG3, SG5, SG6, the PWM comparison circuit 16 selects the signal having the lowest level and compares the selected signal with the triangular wave signal SG7. When the triangular wave signal SG7 is greater than the selected signal, the PWM comparison circuit 16 provides a duty control signal SG8 having a low level to the output circuit 18. When the triangular wave SG7 is smaller than the selected signal, the PWM comparison circuit 16 outputs a duty control signal SG8 having a high level to the output circuit 18. The output circuit 18 inverts the duty control signal SG8, and provides the output signal (inverted duty control signal) SG1 to the gate of the output transistor 3. The output transistor 3 is activated and deactivated in response to the output signal SG1 and thus, maintains the supply current I0, the charging circuit I2, and the output voltage Vout2 at predetermined values.

More specifically, if, for example, the supply current I0 of the AC adapter 4 increases, the potential of the first voltage signal SG2 increases and the potential of the first error output signal SG3 decreases. If the potential of the first error output signal SG3 becomes smaller than the potentials of the second and third error output signals SG5, SG6, the comparison circuit 16 compares the first error output signal SG3 and the triangular wave signal SG7 and generates the duty control signal SG8 such that the duty control signal SG8 remains high over a short period of time (i.e., has a low duty ratio). That is, a decrease in the potential of the first error output signal SG3 prolongs the period during which the potential of the triangular wave signal SG7 exceeds the potential of the error output signal SG3.

A decrease in the duty ratio of the duty control signal SG8 increases the duty ratio of the output signal SG1 and shortens the activated time of the output transistor 3. This decreases the charging current I2 and the supply current I0. The decrease of the supply current I0 decreases the potential of the first voltage signal SG2 and increases the potential of the first error output signal SG3. This causes the duty control signal SG8 to remain high for a long period (i.e., to have a high duty ratio). That is, an increase in the potential of the first error output signal SG3 shortens the period during which the potential of the triangular wave signal SG7 exceeds the potential of the error output signal SG3.

The increase in the duty ratio of the duty control signal SG8 lowers the duty ratio of the output signal SG1 and prolongs the activated period of the output transistor 3. This increases the charging current I2 and the supply current I0. This operation is repeated until the supply current I0 of the AC adapter 4 converges on a predetermined value. That is, until the first voltage signal SG2 converges on a first reference voltage Vref1.

If, for example, the-charging current I2 sent to the battery BT increases, the potential of the second voltage signal SG4 increases and the potential of the second error output signal SG5 decreases. When the potential of the second error output signal SG5 becomes smaller than the potentials of the first and third error output signal SG3, SG6, the comparison circuit 16 compares the second error output signal SG5 with the triangular wave signal SG7 and generates a duty control signal SGB that remains high for a short period (i.e., has a low duty ratio). In other words, a decrease in the potential of the second error output signal SG5 prolongs the period during which the potential of the triangular wave signal SG3 exceeds the potential of the error output signal SG5.

The decrease in the duty ratio of the duty control signal SG8 increases the duty ratio of the output signal SG1 and shortens the activated time of the output transistor 3. This decreases the charging current I2 and the potential of the second voltage signal SG4 and increases the potential of the second error output signal SG5. Furthermore, this causes the duty control signal SG8 to remain high for a long period (i.e., having a high duty ratio). That is, an increase in the potential of the second error output signal SG5 shortens the period during which the potential of the triangular wave signal SG7 exceeds the potential of the error output signal SG3.

The increase in the duty ratio of the duty control signal SG8 decreases the duty ratio of the output signal SG1 and prolongs the activated time of the output transistor 3. This increases the charging current I2. Such operation is repeated until the charging current I2 sent to the battery BT converges on a predetermined value. That is, until the second voltage signal SG4 converges on the second reference voltage Vref2.

If the output voltage Vout2 of the battery BT increases, the potential of the third error output signal SG6 decreases. When the potential of the third error output signal SG6 becomes smaller than the potentials of the first and second error output signals SG3, SG5, the comparison circuit 16 compares the third error output signal SG6 with the triangular wave signal SG7 and generates a duty control signal SG8 that remains high for a short period (i.e., has a low duty ratio). In other words, an increase in the potential of the third error output signal SG6 prolongs the period during which the potential of the triangular wave signal SG3 exceeds the potential of the error output signal SG6.

The decrease in the duty ratio of the duty control signal SG8 increases the duty ratio of the output signal SG1 and shortens the activated time of the output transistor 3. This decreases the charging current I2 and the output voltage Vout2 and increases the potential of the third error output signal SG6. Furthermore, this causes the duty control signal SG8 to remain high for a long period (i.e., have a high duty ratio). That is, an increase in the potential of the third error output signal SG6 shortens the period during which the potential of the triangular wave signal SG7 exceeds the potential of the error output signal SG6.

The increase in the duty ratio of the duty control signal SG8 decreases the duty ratio of the output signal SG1 and prolongs the activated time of the output transistor 3. This increases the charging current I2 and the output voltage Vout2. Such operation is repeated until the output voltage Vout2 of the battery BT converges on a predetermined value. That is, until the output voltage Vout2 converges on the third reference voltage Vref2.

FIG. 2 is a graph showing the relationship between the current and voltage of the AC adapter 4. The AC adapter 4 maintains the DC power supply voltage Vin constant as the supply current I0 increases. When the supply current I0 reaches the overcurrent value $I_{limL}$ (point P1), the overcurrent limiter is activated. This causes the AC adapter 4 to decrease the DC power supply voltage Vin. When the supply current I0 reaches a maximum limit value $I_{limH}$ (point P2), the AC adapter 4 shifts to a shut-down state. As a result, the DC power supply voltage Vin continues to decrease and the supply current I0 starts to decrease.

The DC—DC converter 100, which uses the AC adapter 4, maintains the output voltage Vout2, which is lower than the DC power supply voltage Vin, constant as the charging current I2 increases. When the charging current I2 reaches a predetermined value (point P3), the DC—DC converter 100 maintains the charging current I2 constant while decreasing the output voltage Vout2.

The first to third reference values Vref1–Vref3 are set so that the current supply capacity of the AC adapter 4 can be fully utilized.

However, the employment of an AC adapter having a current supply capacity that differs from that of the AC adapter 4 may lead to the shortcomings described below.

(1) If an AC adapter having a current supply capacity smaller than that of the AC adapter 4 is employed, the AC adapter is apt to enter an overcurrent state since the supply current I0, which is set in accordance with the AC adapter 4, easily exceeds the current supply capacity of the AC adapter. That is, the AC adapter enters a shut-down state whenever the supply current I0 exceeds the maximum limit value $I_{limH}$. Thus, the employment of such an AC adapter in electronic equipment using the DC—DC converter 100 is not preferable.

(2) If an AC adapter having a current supply capacity greater than that of the AC adapter 4 is employed, the current supply capacity of the AC adapter cannot be used fully even if the supply current I0 reaches the maximum value. Thus, the current supply capacity of the AC adapter cannot be put to full use.

Accordingly, a second prior art DC—DC converter 120, shown in FIG. 3, has been proposed. The DC—DC converter 120 has a switch SW which selects a first reference voltage Vref1 from a plurality of reference voltages in accordance with the current supply capacity of the AC adapter. By altering the reference voltage, the supply current I0 of the AC adapter can be optimally adjusted. In this case, the switch SW is shifted by a control signal from the AC adapter. Accordingly, the AC adapter is required to have a special device. This increases the cost of the AC adapter. The switch SW also increases the cost of the DC—DC adapter.

SUMMARY OF THE INVENTION

Accordingly, it is an object of the present invention to provide a method and circuit for controlling a DC—DC converter that can fully utilize the capacity of the AC adapter without increasing cost.

To achieve the above object, the present invention provides a method for controlling a DC—DC converter that generates a system output current and a battery charging current from a supply current generated from a DC power supply voltage. The method includes the steps of comparing the DC power supply voltage with a reference voltage and generating a differential voltage detection signal from the comparison result, comparing the differential voltage detection signal with a triangular wave signal and generating a duty control signal having a duty ratio corresponding to the comparison result, and controlling the supply current flowing through an output transistor to adjust the battery charging current by activating and deactivating the output transistor in accordance with the duty control signal.

In a further aspect of the present invention, a circuit for controlling a DC—DC converter that generates a system output current and a battery charging current from a supply current generated from a DC power supply voltage is provided. The DC—DC converter includes an output transistor through which the supply current flows. The control circuit includes a voltage detection circuit for comparing the DC power supply voltage with a first reference voltage and generating a differential voltage detection signal from the comparison result. A PWM comparison circuit is connected to the voltage detection circuit to compare the differential voltage signal with a triangular wave signal and generate a duty control signal having a duty ratio corresponding to the comparison result. The PWM comparison circuit provides the duty control signal to the output transistor to activate and deactivate the output transistor, thereby controlling the supply current flowing through the output transistor, and adjusting the battery charging current.

In another aspect of the present invention, a DC—DC converter for generating a system output current and a battery charging current from a supply current generated from a DC power supply voltage is provided. The DC—DC converter includes a smoothing circuit having an output coil and a capacitor, an output transistor connected to the smoothing circuit, and a control circuit connected to the output transistor to control the supply current flowing through the output transistor. The control circuit includes a voltage detection circuit for comparing the DC power supply voltage with a first reference voltage and generating a differential voltage detection signal from the comparison result. A PWM comparison circuit is connected to the voltage detection circuit. The PWM comparison circuit compares the differential voltage signal with a triangular wave signal and generates a duty control signal having a duty ratio corresponding to the comparison result. Furthermore, the PWM comparison circuit provides the duty control signal to the output transistor to activate and deactivate the output transistor, thereby controlling the supply current flowing through the output transistor and adjusting the battery charging current.

In a further aspect of the present invention, a control circuit for a DC—DC converter is provided. The DC—DC converter generates a system output current and a battery charging current from a supply current provided by an AC adapter. The DC—DC converter has an output terminal at which the battery charging current is provided, an output transistor connected to the output terminal which supplies the battery charging current, and a coil and a capacitor connected in series between the output transistor and the output terminal. The control circuit includes a voltage detection amplifying circuit having a non-inverting input terminal which receives a DC power supply voltage from the AC adapter and an inverting input terminal which receives a first reference voltage. The voltage detection amplifying circuit compares the DC power supply voltage and the first reference voltage and amplifies a voltage difference thereof to generate a first detection signal. A current detection amplifying circuit has a non-inverting input terminal connected to a first terminal of the resistor and an inverting input terminal connected to a second, opposite terminal of the resistor. The current detection amplifying circuit detects a value of the battery charging current and generates a second detection signal corresponding thereto. A first error amplifying circuit has an inverting input terminal connected to an output of the current detection amplifying circuit which receives the second detection signal and a non-inverting input terminal which receives a second reference voltage. The first error amplifying circuit compares the second detection signal and the second reference voltage and amplifies a voltage difference thereof to generate a third detection signal. A second error amplifying circuit has an inverting input terminal connected to a low potential terminal of the resistor and a non-inverting input terminal which receives a third reference voltage. The second error amplifying circuit compares the potential at the low potential side of the resistor and the third reference voltage and amplifies a voltage difference thereof to generate a fourth detection signal. A PWM comparison circuit has a first non-inverting input terminal connected to the voltage detection amplifying circuit and receiving the first detection signal, a second non-inverting input terminal connected to the first error amplifying circuit and receiving the third detection signal, a third non-inverting input terminal connected to the second error amplifying circuit and receiving the fourth detection signal, and an inverting input terminal which receives a triangular wave signal. The PWM comparison circuit compares one of the first, third and fourth detection signals with the triangular wave signal and amplifies a voltage difference thereof to generate a duty control signal. An output circuit is connected between the output transistor and the PWM comparison circuit for activating and deactivating the transistor in accordance with the duty control signal in order to adjust the battery charging current.

In another aspect of the present invention, a method for controlling a DC—DC converter is provided. The DC—DC converter generates a system output current and a battery charging current from a supply current generated from a DC power supply voltage. The method includes the steps of detecting the DC power supply voltage and adjusting the battery charging current in accordance with the detected DC power supply voltage.

In a further aspect of the present invention, a circuit for controlling a DC—DC converter is provided. The DC—DC converter generates an output current and a battery charging current from a supply current generated from a DC power supply voltage. The DC—DC converter includes an output switch through which the supply current flows to output the charging current. The control circuit includes a voltage detection circuit for detecting the DC power supply voltage; and an adjusting circuit connected to the voltage detection circuit for adjusting the battery charging current in accordance with the detected DC power supply voltage.

In another aspect of the present invention, a DC—DC converter for generating a system output current and a battery charging current from a supply current generated from a DC power supply voltage is provided. The DC—DC converter includes a smoothing circuit including an output coil and a capacitor, an output switch connected to the smoothing circuit, and a control circuit connected to the output switch to control the supply current flowing through the output switch. The control circuit includes a voltage detection circuit for detecting the DC power supply voltage and an adjusting circuit connected to the voltage detection circuit for adjusting the battery charging current in accordance with the detected DC power supply voltage.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
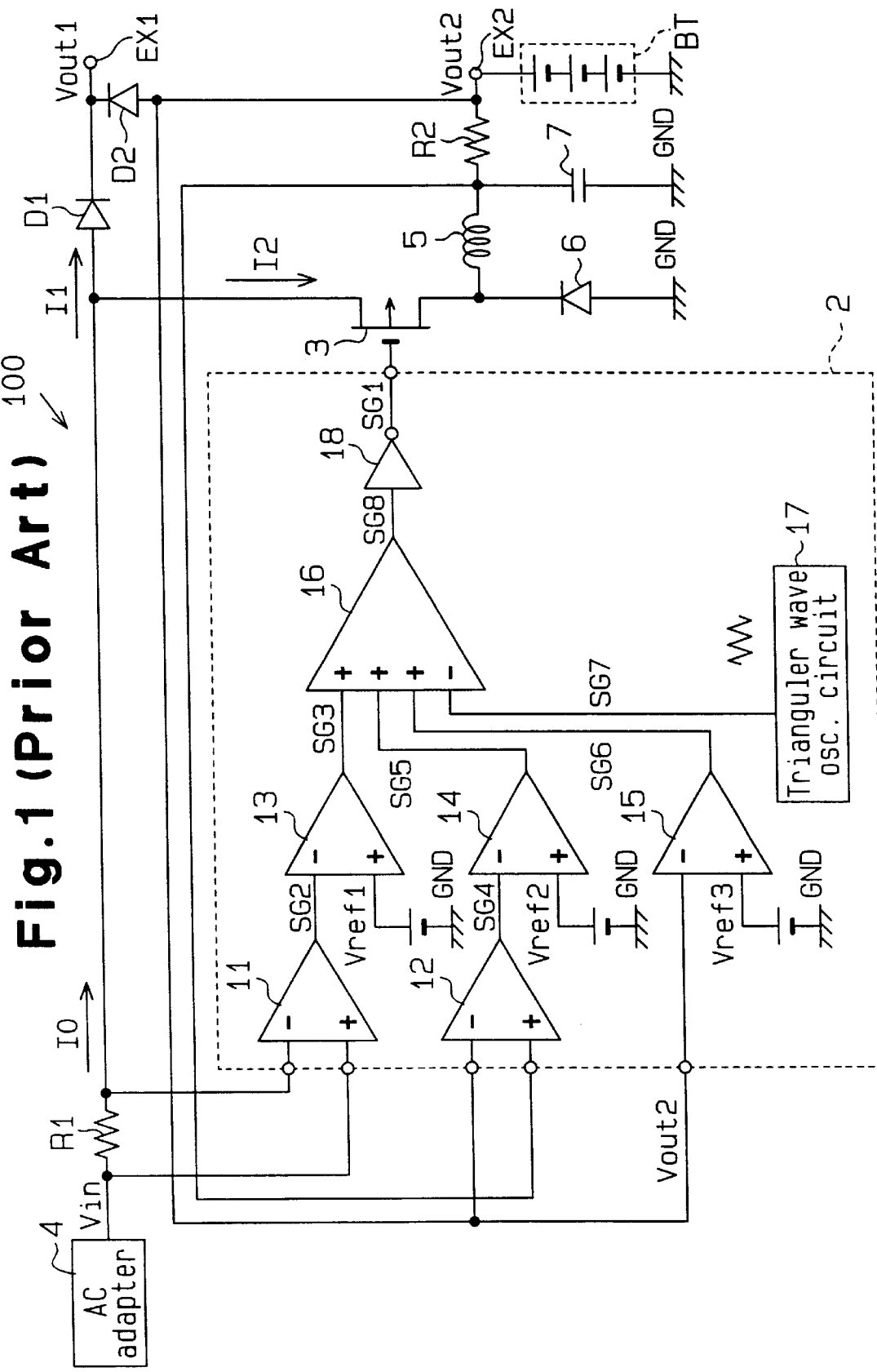
FIG. 1 is a circuit diagram showing a first prior art example of a DC—DC converter.
Figure 2:
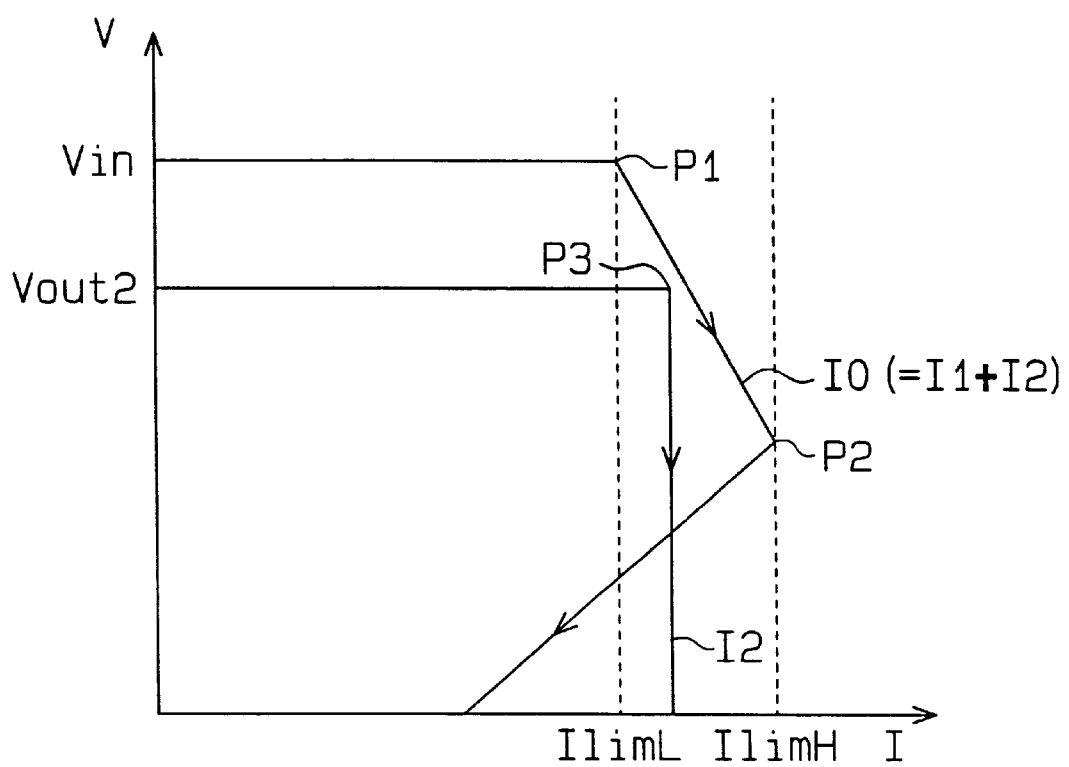
FIG. 2 is a graph showing the relationship between the current and the voltage in an AC adapter of the DC—DC converter of FIG. 1.
Figure 3:
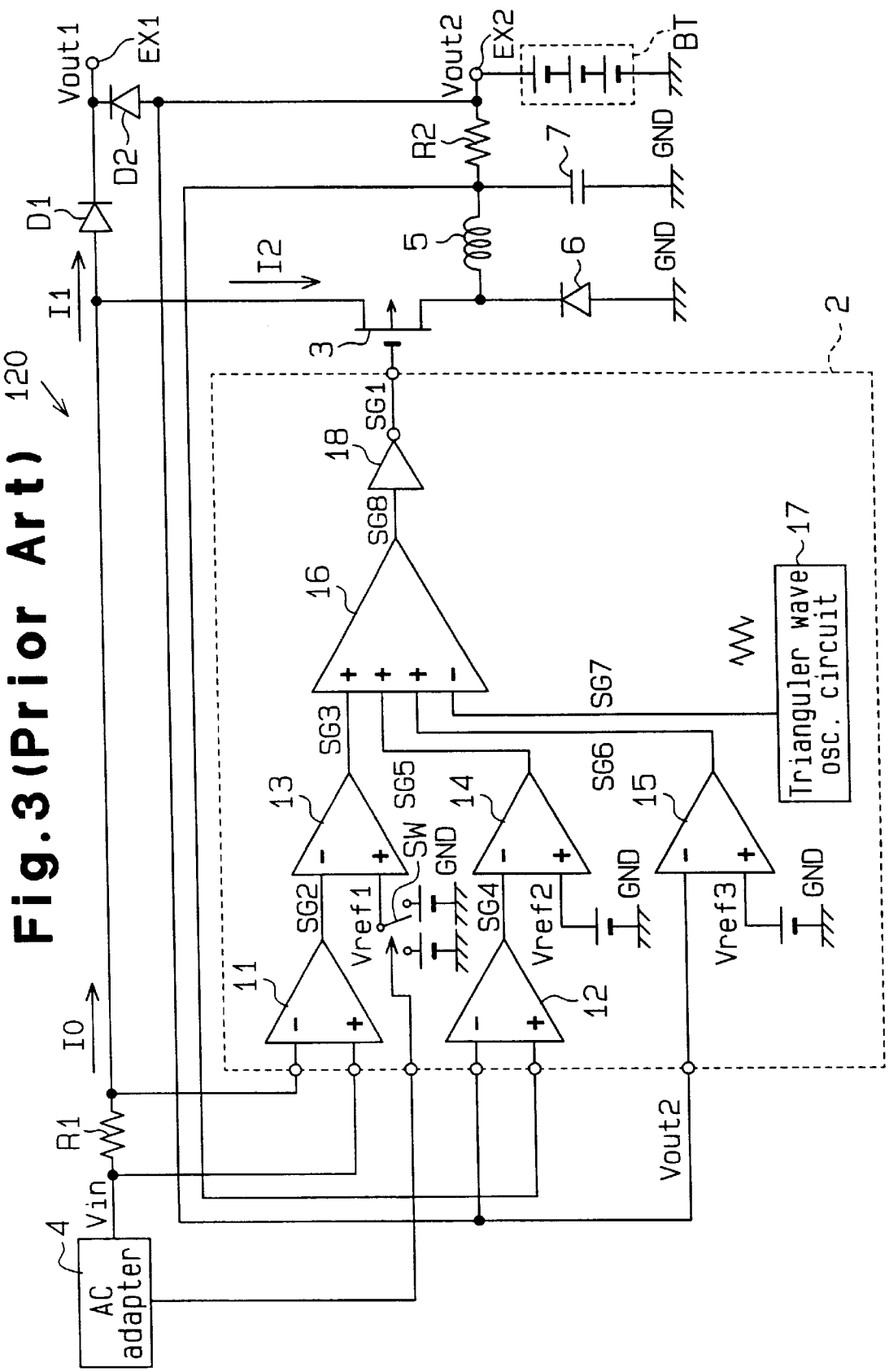
FIG. 3 is a circuit diagram showing a second prior art example of a DC—DC converter.

In the drawings, like numerals are used for like elements throughout.

Figure 4:
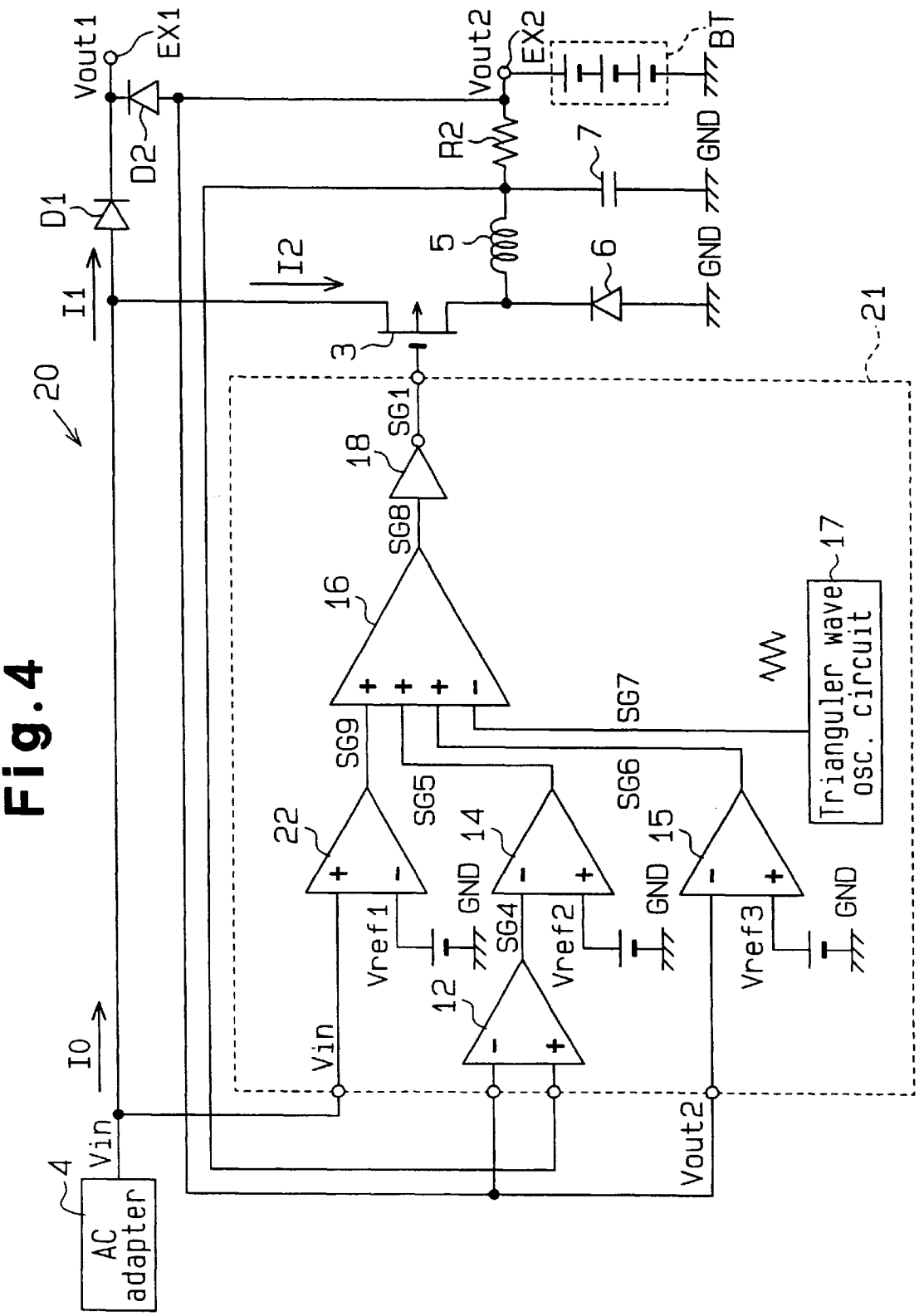
FIG. 4 is a circuit diagram showing a DC—DC converter according to a first embodiment of the present invention.

FIG. 4 is a circuit diagram showing a DC—DC converter 20 according to a first embodiment of the present invention.

The DC—DC converter 20 has a control circuit 21, which includes a current detection amplifying circuit 12, a voltage detection amplifying circuit 22, a first error amplifying circuit 14, a second error amplifying circuit 15, a PWM comparison circuit 16 as an adjusting circuit, a triangular wave oscillating circuit 17, and an output circuit 18.

The voltage detection amplifying circuit 22 has a non-inverting input terminal, which receives the DC power supply voltage Vin from the AC adapter 4, and an inverting input terminal, which receives a first reference voltage Vref1. The voltage detection amplifying circuit 22 compares the DC power supply voltage Vin with the first reference voltage Vref1 and amplifies the voltage difference to generate a detection signal SG9, which is provided to a first non-inverting input terminal of the PWM comparison circuit 16. In this case, a decrease in the DC power supply voltage Vin decreases the potential of the detection signal SG9, and an increase in the DC power supply voltage Vin increases the potential of the detection signal SG9.

Among the detection signal SG9, the first error output signal SG5, and the second error output signal SG6, the PWM comparison circuit 16 selects the signal having the lowest level and compares the selected signal with a triangular wave signal SG7 provided to the inverting input terminal. The PWM comparison circuit 16 outputs a pulse signal having a low level when the triangular wave signal SG7 is greater than the detection signal or the error output signals and outputs a pulse signal having a high level when the triangular wave signal SG7 is smaller than the detection signal or the error output signals. The pulse signal, or duty control signal SG8, is received by the output circuit 18. The output circuit 18 inverts the control signal SG8 and sends an output signal SG1 to the gate of an output transistor 3.

The operation of the DC—DC converter 20 will now be described.

When the charging current I2 provided to the battery BT differs from a predetermined value, a change occurs in the output signal SG4 of the current detection amplifying circuit 12. This alters the first error signal SG5 output by the second error amplifying circuit 14. If the first error output signal SG5 is smaller than the detection signal SG9 and the second error output signal SG6, the PWM comparison circuit 16 compares the first error output signal SG5 with the triangular wave signal SG7 and generates a duty control signal SG8 having a duty ratio corresponding to the comparison result. The duty control signal SG8 is inverted by the output circuit 18 and applied to the output transistor 3 as the output signal SG1. The output transistor 3 is activated and deactivated in response to the output signal SG1 to converge the charging current I2 of the battery BT on the predetermined value.

When the output voltage Vout2 of the battery BT differs from a predetermined value, a change occurs in the second error output signal SG6 of the second error amplifying circuit 15. If the second error output signal SG6 is smaller than the detection signal SG9 and the first error output signal SG5, the PWM comparison circuit 16 compares the second error output signal SG6 with the triangular wave signal SG7 and generates a duty control signal SG8 having a duty ratio corresponding to the comparison result. The duty control signal SG8 is inverted by the output circuit 18 and applied to the output transistor 3 as the output signal SG1. The output transistor 3 is activated and deactivated in response to the output signal SG1 to converge the output voltage Vout2 of the battery BT on the predetermined value.

When the output current I1 supplied to the system from the output terminal EX1 increases and the sum of the output current I1 and the charging current I2 (i.e., supply current I0) exceeds the current supply capacity of the AC adapter 4, the DC power supply voltage Vin of the AC adapter 4 decreases. If the detection signal SG9 is smaller than the first and second error output signals SG5, SG6, the PWM comparison circuit 16 compares the detection signal SG9 with the triangular wave signal SG7. The decrease in the potential of the detection signal SG9 prolongs the period during which the potential of the triangular wave signal SG7 exceeds the potential of the detection signal SG9. Thus, the duty control signal SG8 output from the PWM comparison circuit 16 remains high for a short period (i.e., has a low duty ratio). The output circuit 18 inverts the duty control signal SG8 and provides the output transistor 3 with an output signal SG1 having an increased duty ratio. This shortens the period during which the output transistor 3 is activated and decreases the charging current I2. As a result, the DC power supply voltage Vin increases and the output voltage Vout2 of the battery BT decreases.

An increase in the DC power supply voltage Vin increases the potential of the detection signal SG9 output by the voltage detection amplifying circuit 22. The increase in the potential of the detection signal SG9 shortens the period during which the potential of the triangular wave signal SG3 exceeds the potential of the detection signal SG9. Thus, the period during which the triangular wave signal SG3 is equal to or lower than the detection signal SG9 is prolonged. In other words, the duty control signal SG8 output from the PWM comparison circuit 16 remains high for a long period (i.e., has a high duty ratio). The output circuit 18 inverts the duty control signal SG8 and provides the output transistor 3 with an output signal SG1 having a decreased duty ratio. This prolongs the activated time of the output transistor 3 and increases the charging current I2. As a result, the DC power supply voltage Vin decreases and increases the output voltage Vout2 of the battery BT. Such operation is repeated until the DC power supply voltage Vout2 converges on the predetermined value.

The DC—DC converter 20 of the first embodiment has the advantages described below.

(1) When the supply current I0 of the AC adapter 4 increases and the DC power supply voltage Vin decreases, the charging current I2 of the battery BT and the output voltage Vout2 of the battery BT decrease. When the supply current I0 of the AC adapter 4 decreases and the DC power supply voltage Vin increases, the charging current I2 of the battery BT and the output voltage Vout2 of the battery BT increases. In other words, the electric power (Vout2·I2) provided to the battery BT is adjusted so that the electric power (Vin·I0) becomes constant. The electric power (Vin·I0) is the sum of the electric power (Vin·I1) and the electric power (Vout2·I2). Accordingly, regardless of the current supply capacity of the AC adapter 4 connected to the electronic device, the DC—DC converter 20 maintains the DC power supply voltage Vin by adjusting the power supplied to the battery BT in accordance with the current supply capacity of the AC adapter 4. Thus, the current supply capacity of the AC adapter 4 can be fully utilized without requiring any special devices. This prevents an increase in cost.

(2) The charging current I2 provided to the battery BT is detected by the current detection amplifying circuit 12. The PWM comparison circuit 16 controls the charging current I2 in accordance with the detected current to maintain the charging current I2 constant. Accordingly, the battery BT is prevented from being damaged by overcurrent.

(3) The output voltage Vout2 of the battery BT is detected by the second error amplifying circuit 15. The PWM comparison circuit 16 controls the output voltage Vout2 of the battery BT in accordance with the detected voltage to maintain the output voltage Vout2. Accordingly, the battery BT is prevented from being damaged by overvoltage charging.

(4) The DC—DC converter 20 of the first embodiment does not employ the first current detection amplifying circuit 11 and the resistor R1 employed in the prior art example of FIG. 1. The resistor R1 employed in the prior art has a relatively small resistance to decrease power loss and a relatively large current capacity to cope with a relatively large supply current I0. Such resistor r1 is relatively expensive. Since the resistor R1 is not required in the first embodiment, the cost of the DC—DC converter 20 is reduced.

Figure 5:
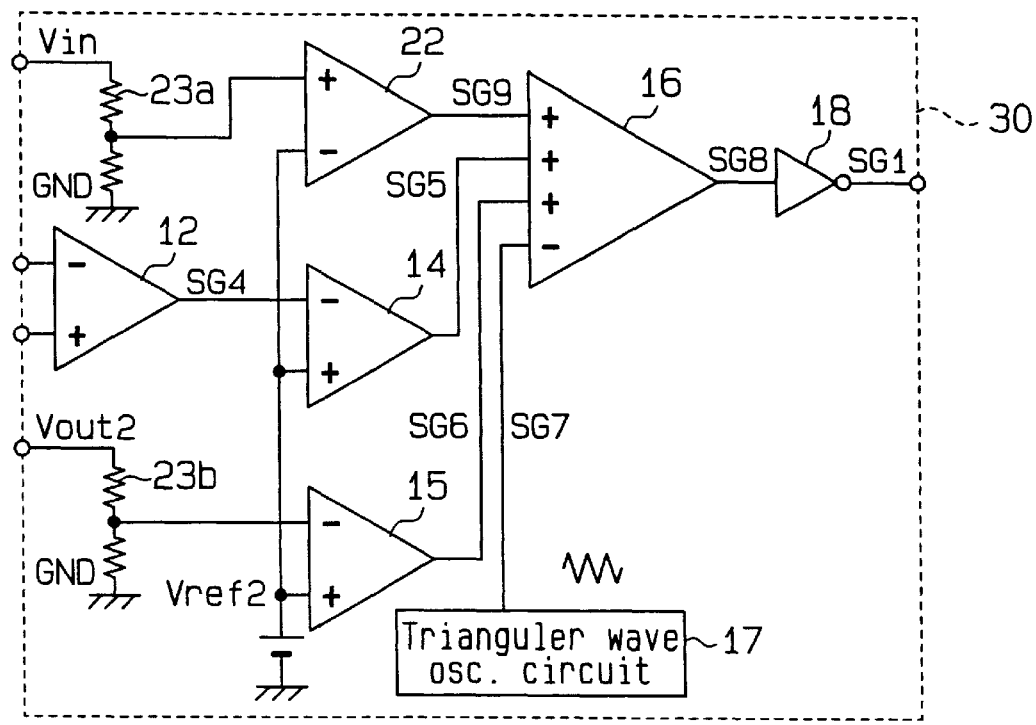
FIG. 5 is a circuit diagram showing a DC—DC converter according to a second embodiment of the present invention.

FIG. 5 is a circuit diagram showing a control circuit 30 of a DC—DC converter according to a second embodiment of the present invention. In the second embodiment, the second reference voltage Vref2 is set so that it is lower than the first and third reference voltages Vref1, Vref3. The second reference voltage Vref2 is provided to the inverting input terminal of a voltage detection amplifying circuit 22 and the non-inverting input terminals of first and second error amplifying circuits 14, 15. The control circuit 30 includes a resistance voltage dividing circuit 23a connected to the non-inverting input terminal of the voltage detection amplifying circuit 22 and a resistance voltage dividing circuit 23b connected to the inverting input terminal of the second error amplifying circuit 15. The resistance voltage dividing circuit 23a is configured to decrease the DC power supply voltage Vin in accordance with the second reference voltage Vref2. The resistance voltage dividing circuit 23b is configured to decrease the output voltage Vout2 in accordance with the second reference voltage Vref2. In other words, the resistance voltage dividing circuits 23a, 23b divide the DC power supply voltage Vin and the output voltage Vout2, respectively. In the second embodiment, a single power supply is enough to generate the single reference voltage Vref2.

The second embodiment may be modified by providing the first reference voltage Vref1 to the voltage detection amplifying circuit 22 and the first and second error amplifying circuits 14, 15. In this case, the resistor voltage dividing circuit 23a is replaced by a resistor voltage dividing circuit, which divides the voltage of the voltage signal SG4. This resistor voltage dividing circuit is connected between the current detection amplifying circuit 12 and the first error amplifying circuit 14.

Figure 6:
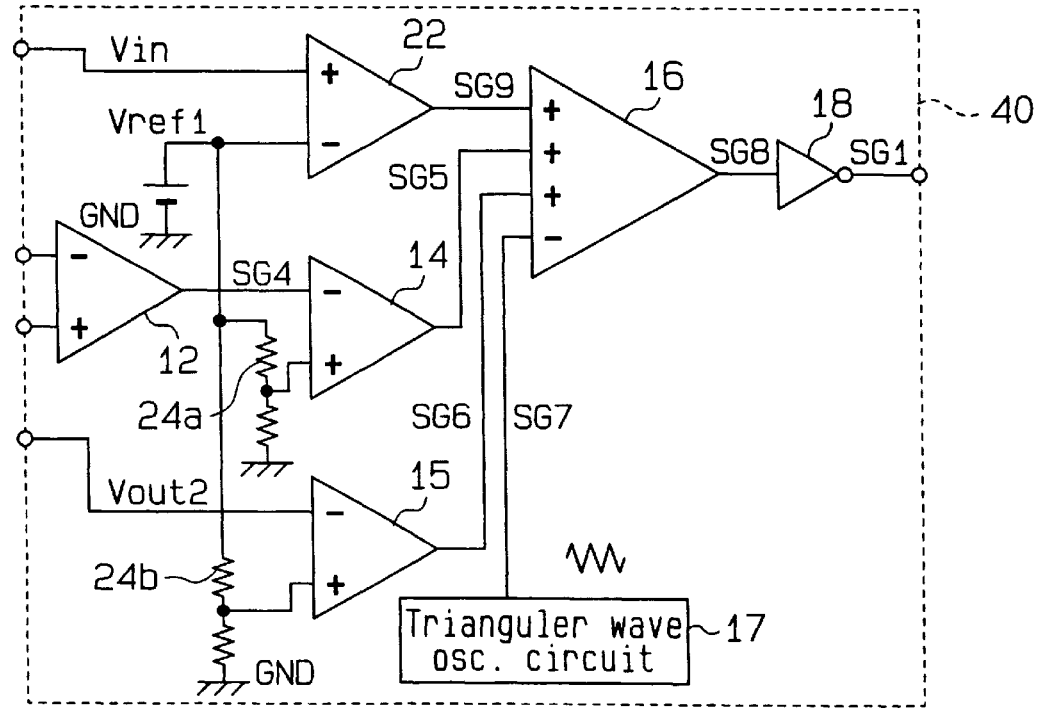
FIG. 6 is a circuit diagram showing a DC—DC converter according to a third embodiment of the present invention.

FIG. 6 is a circuit diagram showing a control circuit 40 of a DC—DC converter according to a third embodiment of the present invention. In the third embodiment, the first reference voltage Vref1 is set so that it is higher than the second and third reference voltages Vref2, Vref3. The first reference voltage Vref1 is provided to the inverting input terminal of the voltage detection amplifying circuit 22. The control circuit 40 includes a resistance voltage dividing circuit 24a connected between the first reference voltage Vref1 and the non-inverting input terminal of the first error amplifying circuit 14, and a resistance voltage dividing circuit 24b connected between the first reference voltage Vref1 and the non-inverting input terminal of the second error amplifying circuit 15. The resistance voltage dividing circuit 24a decreases the first reference voltage Vref1 and generates the second reference voltage Vref2, which is provided to the first error amplifying circuit 14. The resistance voltage dividing circuit 24b decreases the first reference voltage Vref1 and generates the third reference voltage Vref3, which is provided to the second error amplifying circuit 15. In other words, the resistance voltage dividing circuits 24*a*, 24*b* divide the first reference voltage Vref to generate the second and third reference voltages Vref. In the third embodiment, only a single power supply is required to generate the single reference voltage Vref1.

The third embodiment may be modified by directly providing the second reference voltage Vref2 to the first error amplifying circuit 14. In this case, a resistance voltage dividing circuit, which divides the second reference voltage Vref2 and generates the first reference voltage Vref1, and a resistance voltage dividing circuit, which divides the second reference voltage Vref2 and generates the third reference voltage Vref3, are provided.

It should be apparent to those skilled in the art that the present invention may be embodied in many other specific forms without departing from the spirit or scope of the invention. Particularly, it should be understood that the present invention may be embodied in the following forms.

An n-channel MOS transistor may be employed as the output transistor 3. In this case, if is preferable that the output circuit 18 includes an buffer circuit or an even number of inverters, which are connected in series to one another.

The triangular wave oscillating circuit 17 may be formed on a semiconductor integrated circuit chip that differs from the semiconductor integrated circuit chip on which the control circuit 21 is formed. The control circuit 21 may be formed on the same semiconductor integrated circuit chip as the output transistor 3 and a smoothing circuit that includes the output coil 4 and the capacitor 7. That is, the DC—DC converter may be formed on a single semiconductor substrate.

The present examples and embodiments are to be considered as illustrative and not restrictive, and the invention is not to be limited to the details given herein, but may be modified within the scope and equivalence of the appended claims.

What is claimed is:

1. A method for controlling a DC—DC converter that generates a system output current and a battery charging current from a supply current generated from a DC power supply voltage, the method comprising the steps of:
   comparing the DC power supply voltage with a reference voltage and generating a differential voltage detection signal from the comparison result;
   comparing the differential voltage detection signal with a triangular wave signal and generating a duty control signal having a duty ratio corresponding to the comparison result; and
   controlling the supply current flowing through an output transistor to reduce the battery charging current by deactivating the output transistor in accordance with the duty control signal when the DC power supply voltage decreases.

2. The DC—DC converter controlling method according to claim 1, further comprising the steps of:
   detecting the battery charging current; and
   controlling the battery charging current so that it remains substantially constant using the detected battery charging current.

3. The DC—DC converter controlling method according to claim 1, further comprising the steps of:
   detecting a battery charging voltage based on the battery charging current; and
   controlling the battery charging voltage so that it remains substantially constant using the detected battery charging voltage.

4. A circuit for controlling a DC—DC converter that generates a system output current and a battery charging current from a supply current generated from a DC power supply voltage, wherein the DC—DC converter includes an output transistor through which the supply current flows, wherein the control circuit comprises:
   a voltage detection circuit for comparing the DC power supply voltage with a first reference voltage and generating a differential voltage detection signal from the comparison result; and
   a PWM comparison circuit connected to the voltage detection circuit for comparing the differential voltage detection signal with a triangular wave signal and generating a duty control signal having a duty ratio corresponding to the comparison result, the PWM comparison circuit providing the duty control signal to the output transistor to deactivate the output transistor, thereby controlling the supply current flowing through the output transistor, and reducing the battery charging current when the DC power supply voltage decreases.

5. The DC—DC converter control circuit according to claim 4, further comprising a charging current detection circuit for detecting the battery charging current and generating a charging current detection signal, wherein the PWM comparison circuit compares the charging current detection signal with the triangular wave signal and generates the duty control signal having a duty ratio corresponding to the comparison result, the PWM comparison circuit providing the duty control signal to the output transistor to activate and deactivate the output transistor, thereby controlling the supply current flowing through the output transistor, and maintain the buttery charging current constant.

6. The DC—DC converter control circuit according to claim 5, wherein the charging current detection circuit includes:
   a current detection circuit for converting the battery charging current to a voltage signal; and
   an error amplifying circuit connected to the current detection circuit to compare the voltage signal with a second reference voltage and generate the charging current detection signal.

7. The DC—DC converter control circuit according to claim 6, wherein the voltage detection circuit receives the second reference voltage as the first reference voltage, and the control circuit further comprises:
   a resistance dividing circuit connected to the voltage detection circuit to divide the DC power supply voltage in accordance with the second reference voltage and provide the divided voltage to the voltage detection circuit.

8. The DC—DC converter control circuit according to claim 6, further comprising a resistance dividing circuit connected to the error amplifying circuit to divide the first reference voltage, generate the second reference voltage, and provide the second reference voltage to the error amplifying circuit.

9. The DC—DC converter control circuit according to claim 6, wherein the error amplifying circuit receives the first reference voltage as the second reference voltage, and wherein the control circuit further comprises a resistance dividing circuit for dividing the voltage of the voltage signal from the current detection circuit in accordance with the first reference voltage and providing the divided voltage to the error amplifying circuit.

10. The DC—DC converter control circuit according to claim 6, further comprising a resistance dividing circuit connected to the voltage detection circuit to divide the second reference voltage, generate the first reference voltage, and provide the first reference voltage to the voltage detection circuit.

11. The DC—DC converter control circuit according to claim 4, further comprising a charging voltage detection circuit for detecting a battery charging voltage based on the battery charging current and generating a charging voltage detection signal, wherein the PWM comparison circuit compares the charging voltage detection signal with the triangular wave signal and generates the duty control signal having a duty ratio corresponding to the comparison result, the PWM comparison circuit providing the duty control signal to the output transistor to activate and deactivate the output transistor to control the supply current flowing through the output transistor, and maintain the buttery charging voltage constant.

12. The DC—DC converter control circuit according to claim 11, wherein the charging voltage detection circuit includes an error amplifying circuit for comparing the battery charging voltage with a second reference voltage to generate a charging voltage detection signal.

13. The DC—DC converter control circuit according to claim 12, wherein the error amplifying circuit receives the first reference voltage as the second reference voltage, the control circuit further comprising a resistance dividing circuit for dividing the battery charging voltage in accordance with the first reference voltage and providing the divided voltage to the error amplifying circuit.

14. The DC—DC converter control circuit according to claim 12, further comprising a resistance dividing circuit connected to the error amplifying circuit to divide the first reference voltage, generate the second reference voltage, and provide the second reference voltage to the error amplifying circuit.

15. The DC—DC converter control circuit according to claim 12, wherein the voltage detection circuit receives the second reference voltage as the first reference voltage, the control circuit further comprising a resistance dividing circuit connected to the voltage detection circuit to divide the DC power supply voltage in accordance with the second reference voltage and provide the divided voltage to the voltage detection circuit.

16. The DC—DC converter control circuit according to claim 12, further comprising a resistance dividing circuit connected to the voltage detection circuit to divide the second reference voltage, generate the first reference voltage, and provide the first reference voltage to the voltage detection circuit.

17. A DC—DC converter for generating a system output current and a battery charging current from a supply current generated from a DC power supply voltage, the DC—DC converter comprising:

a smoothing circuit including an output coil and a capacitor;

an output transistor connected to the smoothing circuit; and a control circuit connected to the output transistor to control the supply current flowing through the output transistor, wherein the control circuit includes:

a voltage detection circuit for comparing the DC power supply voltage with a first reference voltage and generating a differential voltage detection signal from the comparison result; and a PWM comparison circuit connected to the voltage detection circuit, wherein the PWM comparison circuit compares the differential voltage signal with a triangular wave signal and generates a duty control signal having a duty ratio corresponding to the comparison result, the PWM comparison circuit providing the duty control signal to the output transistor to activate and deactivate the output transistor, thereby controlling the supply current flowing through the output transistor and reducing the battery charging current when the DC power supply voltage decreases.

18. A control circuit for a DC—DC converter, the DC—DC converter generating a system output current and a battery charging current from a supply current provided by an AC adapter, wherein the DC—DC converter has an output terminal at which the battery charging current is provided, an output transistor connected to the output terminal which supplies the battery charging current, and a coil and a capacitor connected in series between the output transistor and the output terminal, the control circuit comprising:

a voltage detection amplifying circuit having a non-inverting input terminal which receives a DC power supply voltage from the AC adapter and an inverting input terminal which receives a first reference voltage, the voltage detection amplifying circuit comparing the DC power supply voltage and the first reference voltage and amplifying a voltage difference thereof to generate a first detection signal;

a current detection amplifying circuit having a non-inverting input terminal connected to a first terminal of the resistor and an inverting input terminal connected to a second, opposite terminal of the resistor, the current detection amplifying circuit detecting a value of the battery charging current and generating a second detection signal corresponding thereto;

a first error amplifying circuit having an inverting input terminal connected to an output of the current detection amplifying circuit which receives the second detection signal and a non-inverting input terminal which receives a second reference voltage, the first error amplifying circuit comparing the second detection signal and the second reference voltage and amplifying a voltage difference thereof to generate a third detection signal;

a second error amplifying circuit having an inverting input terminal connected to a low potential terminal of the resistor and a non-inverting input terminal which receives a third reference voltage, the second error amplifying circuit comparing the potential at the low potential side of the resistor and the third reference voltage and amplifying a voltage difference thereof to generate a fourth detection signal;

a PWM comparison circuit having a first non-inverting input terminal connected to the voltage detection amplifying circuit and receiving the first detection signal, a second non-inverting input terminal connected to the first error amplifying circuit and receiving the third detection signal, a third non-inverting input terminal connected to the second error amplifying circuit and receiving the fourth detection signal, and an inverting input terminal which receives a triangular wave signal, the PWM comparison circuit comparing one of the first, third and fourth detection signals with the triangular wave signal and amplifying a voltage difference thereof to generate a duty control signal; and an output circuit connected between the output transistor and the PWM comparison circuit for activating and deactivating the transistor in accordance with the duty control signal in order to reduce the battery charging current when the DC power supply voltage decreases.

19. A method for controlling a DC—DC converter that generates a system output current and a battery charging current from a supply current generated from a DC power supply voltage, the method comprising the steps of:

reducing the DC power supply voltage;

adjusting the battery charging current when the detected DC power supply voltage decreases.

20. A circuit for controlling a DC—DC converter that generates an output current and a battery charging current from a supply current generated from a DC power supply voltage, wherein the DC—DC converter includes an output switch through which the supply current flows to output the charging current, wherein the control circuit comprises:

a voltage detection circuit for detecting the DC power supply voltage; and an adjusting circuit connected to the voltage detection circuit for adjusting the battery charging current when the detected DC power supply voltage decreases.

21. A DC—DC converter for generating a system output current and a battery charging current from a supply current generated from a DC power supply voltage, the DC—DC converter comprising:

a smoothing circuit including an output coil and a capacitor;

an output switch connected to the smoothing circuit; and a control circuit connected to the output switch to control the supply current flowing through the output switch, wherein the control circuit includes:

a voltage detection circuit for detecting the DC power supply voltage; and an adjusting circuit connected to the voltage detection circuit for reducing the battery charging current when the detected DC power supply voltage decreases.

* * * * *